(12) United States Patent
Hardenburger

(10) Patent No.: US 7,941,979 B2
(45) Date of Patent: May 17, 2011

(54) THERMAL PROCESSING CABINET WITH MONOLITHIC FLOOR

(75) Inventor: Paul Hardenburger, Hutchinson, KS (US)

(73) Assignee: Marlen International, Inc., Overland Park, KS (US)

( * ) Notice: Subject to any disclaimer, the term of this patent is extended or adjusted under 35 U.S.C. 154(b) by 302 days.

(21) Appl. No.: 12/396,697

(22) Filed: Mar. 3, 2009

(65) Prior Publication Data
US 2010/0223863 A1 Sep. 9, 2010

(51) Int. Cl.
*E04B 5/00* (2006.01)
*F27D 99/00* (2010.01)

(52) U.S. Cl. ............ 52/177; 52/414; 52/302.1; 137/312; 137/362; 119/450

(58) Field of Classification Search ............ 52/177, 52/185, 653.1, 414, 302.1, 302.3, 334, 293.3, 52/294, 241, 432, 483.1, 650.3; 4/507, 613; 99/482; 126/8, 20, 369; 137/312, 362; 119/450
See application file for complete search history.

(56) References Cited

U.S. PATENT DOCUMENTS

| | | | | |
|---|---|---|---|---|
| 2,106,516 A * | 1/1938 | Cheney | | 4/613 |
| 2,352,590 A | 6/1944 | Trinkle | | |
| 2,505,973 A | 5/1950 | Julian | | |
| 2,883,852 A * | 4/1959 | Midby | | 52/236.8 |
| 3,130,662 A * | 4/1964 | Robinson | | 99/352 |
| 3,751,870 A * | 8/1973 | Vesei | | 52/656.1 |
| 3,762,112 A * | 10/1973 | Evans et al. | | 52/79.8 |
| 3,887,716 A * | 6/1975 | Seelbach | | 426/231 |
| 3,903,788 A * | 9/1975 | Freeland et al. | | 99/475 |
| 4,336,788 A * | 6/1982 | Stein | | 126/8 |
| 4,541,132 A * | 9/1985 | Long | | 4/614 |
| 4,635,413 A * | 1/1987 | Hansen et al. | | 52/92.2 |
| 4,644,708 A * | 2/1987 | Baudot et al. | | 52/79.9 |
| 4,918,897 A * | 4/1990 | Luedtke | | 52/742.14 |
| 5,371,980 A * | 12/1994 | Dix | | 52/34 |
| 5,398,598 A | 3/1995 | McFarlane et al. | | |
| 5,402,612 A * | 4/1995 | diGirolamo et al. | | 52/241 |
| 5,447,000 A * | 9/1995 | Larsen | | 52/79.1 |
| 5,775,847 A | 7/1998 | Carlinsky et al. | | |
| 6,003,169 A * | 12/1999 | Davis, Jr. | | 4/613 |
| 6,088,984 A * | 7/2000 | Kirby | | 52/302.1 |

(Continued)

FOREIGN PATENT DOCUMENTS

DE 101 22 035 A1 * 11/2002
GB 2 244 428 A * 4/1991

*Primary Examiner* — Robert J Canfield
(74) *Attorney, Agent, or Firm* — Hovey Williams LLP

(57) ABSTRACT

Smokehouses (20) or other similar thermal processing cabinets or houses are provided with improved floor assemblies (22) which eliminate fluid collection and provide a high degree of structural integrity. The smokehouses (20) include upright walls (24, 26) supported on the floor assemblies (22). Each floor assembly (22) has one or more weldment frame assemblies (38) including a peripheral frame assembly (46) with opposed wall receiving channel segments (52) and frame elements (54). Drainage structure such as one or more tubular drain units (44) are also preferably secured to the weldment frame assemblies (38) and are positioned to effect proper liquid drainage. Tread plates (42) are secured to the weldment frame assemblies (38). In order to construct a floor assembly (22), an appropriately sized recess (66) is formed and the weldment frame assemblies (38) and drain units (44) are installed. A monolithic pour of concrete (40) is then placed within the weldment frame assemblies (38) and allowed to cure. The tread plates (42) are then installed to complete the construction.

28 Claims, 7 Drawing Sheets

U.S. PATENT DOCUMENTS

| | | | |
|---|---|---|---|
| 6,155,015 A * | 12/2000 | Kirby | 52/302.1 |
| 6,460,297 B1 * | 10/2002 | Bonds et al. | 52/79.1 |
| 6,722,287 B2 | 4/2004 | Norton et al. | |
| 2006/0277847 A1 * | 12/2006 | Yates | 52/177 |
| 2009/0217612 A1 * | 9/2009 | Window | 52/414 |
| 2010/0000169 A1 * | 1/2010 | Grave et al. | 52/302.1 |

* cited by examiner

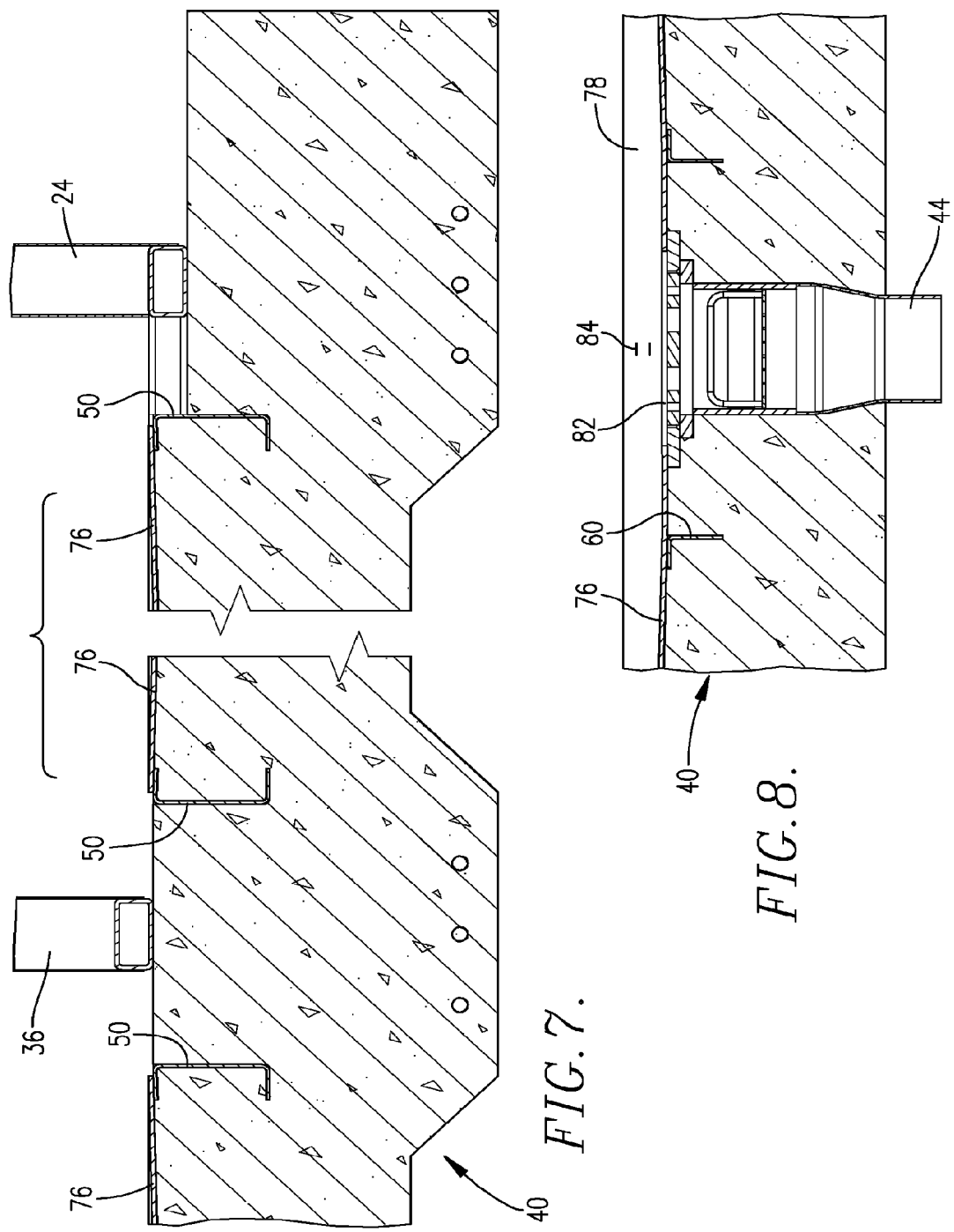

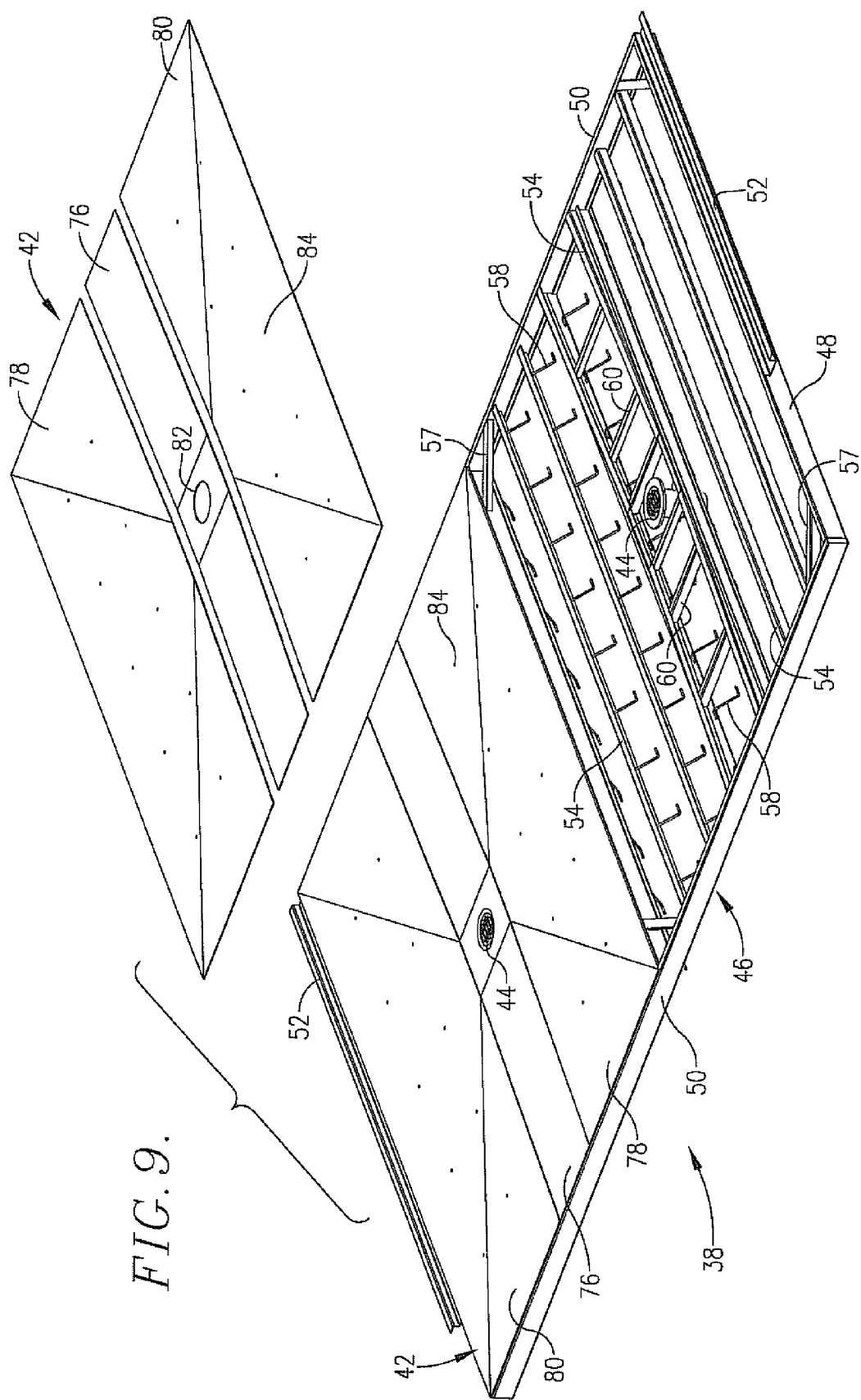

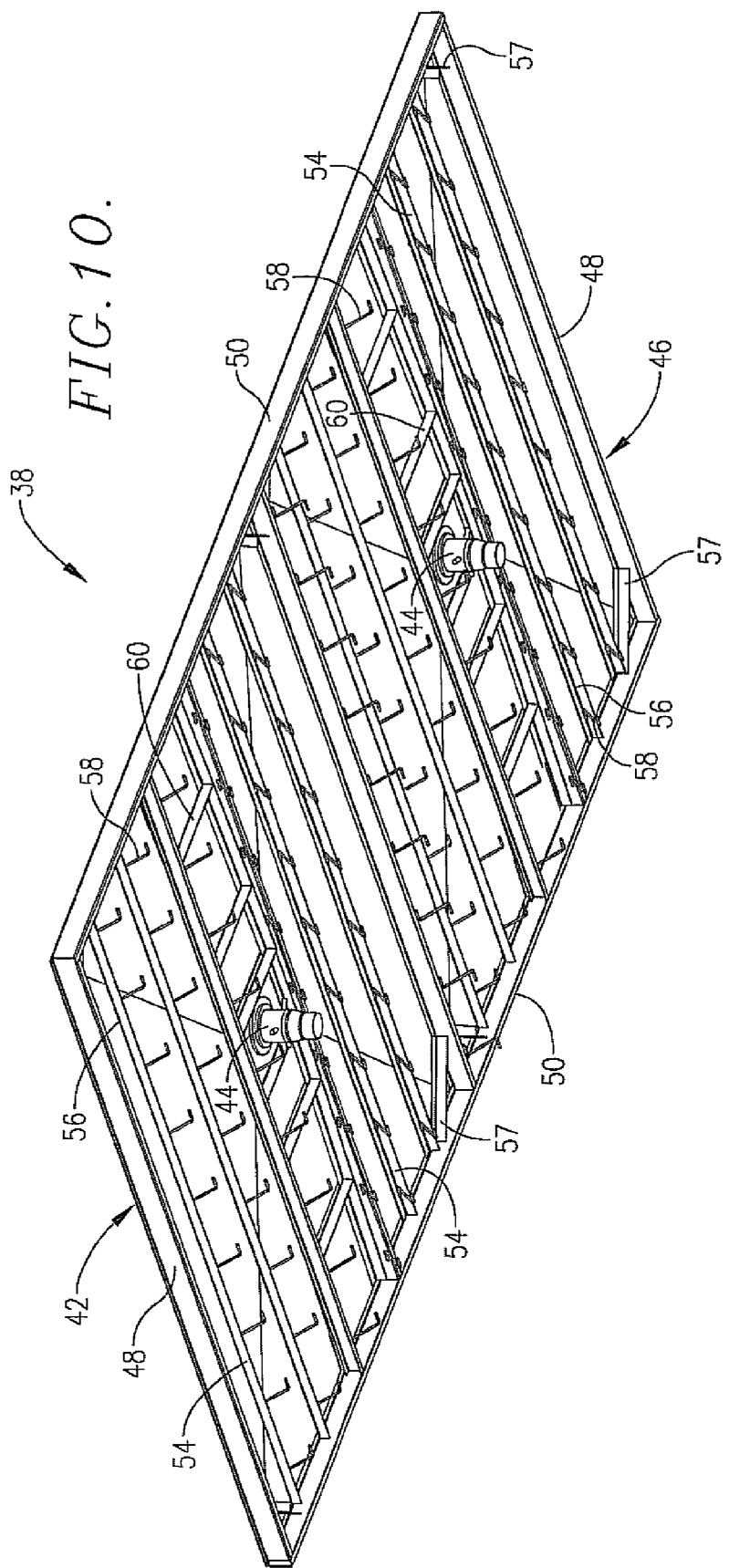

THERMAL PROCESSING CABINET WITH MONOLITHIC FLOOR

BACKGROUND OF THE INVENTION

1. Field of the Invention

The present invention is broadly concerned with improved floor assemblies for use in constructing thermal processing cabinets or houses such as smokehouses and chillers. More particularly, the invention is concerned with such floor assemblies, weldment frames forming a part of the floor assemblies, and completed thermal processing cabinets wherein the problems of unwanted liquid collection and inadequate load-bearing capacities are overcome.

2. Description of the Prior Art

Thermal processing of food products such as meat involves the cooking and/or chilling of these products in an upright cabinet or house. The products are placed on carriers with the latter being positioned within the cabinet or house for cooking, smoking, or chilling. The carriers may be wheeled or moveable by a forklift. The product carriers can be very heavy and accordingly the cabinet or house floor must support this weight. If the carriers are moved using a forklift, the floor must also be able to accommodate the additional weight of the forklift.

Thermal processing cabinets or houses commonly have a floor provided with a stainless steel sheet metal tread surface. Accordingly, structure must be provided for adequately supporting the tread surface. In the case of cabinets or houses with light carrier loadings, an insulated panel floor may be used. However, where heavier loadings and/or forklift weights must be accommodated, a concrete sub-floor is usually necessary.

A common method of constructing a concrete floor assembly for a thermal processing cabinet or house begins with pouring a concrete foundation having a recess large enough to accept the footprint of the cabinet or house. Such recesses are typically formed at a depth of around 2.5 inches, with one or more drain openings. Next, the cabinet or house walls are set into the recess and a pre-formed gridwork of angle iron (typically stainless steel) is placed within the confines of the cabinet or house walls and is secured to the concrete using fasteners. The gridwork is constructed to present sloped uppermost surfaces leading to the drain(s). A drain fitting is next installed, followed by a second pour of concrete covering the gridwork. The second pour is then screeded to the top surface of the gridwork to provide a drainage surface, and the tread plate is then installed by welding it in place.

This type of floor installation suffers from a number of problems. First, the floor construction requires two separate concrete pours, one for the initial recess sub-floor and a second to complete the floor after the cabinet or house walls are installed. Furthermore, the conventional floor designs inevitably create a collection basin or region between the separate concrete pours which holds water and other liquids. This provides a very effective but unwelcome environment for bacterial growth which is a very undesirable condition in food plants, in that it compromises food safety. Moreover, given that the initial concrete recess is typically at a fixed depth and the angle iron gridwork slopes to the central floor drain, the depth of the floor "thins out" or decreases in depth toward the drain. This thinning decreases the integrity of the subfloor and can lead to floor break-up or "crumbling" which eventually causes the underlying gridwork to sag. Once this occurs, the tread plate can be bent or deformed under the weight of the food carriers and/or forklifts, causing floor concavities which do not drain. Such a deformed floor condition will often hold water (known as "ponding") which again is very undesirable from the standpoint of food safety.

The following references describe conventional food processing cabinets or houses and the floors thereof: U.S. Pat. Nos. 6,722,287; 5,775,847; 5,398,598; 2,505,973; and 2,352,590.

SUMMARY OF THE INVENTION

The present invention overcomes the problems outlined above, and provides weldment frames designed for use in fabricating thermal processing cabinet floors. Broadly speaking, such weldment frames include a peripheral frame assembly including opposed wall-receiving channel segments, and a plurality of elongated, laterally spaced apart frame elements secured to and extending between opposed portions of the peripheral frame. The weldment frames preferably are associated with drainage structure. For example, the weldment frames may be designed to receive one or more tubular drain units located within the peripheral frame. Alternately, the weldment frames may be configured to have an apex or "peak" in the central region thereof with a sloping gradient toward peripheral drains or doorways. Further, if desired the weldment frame may be designed with a slope from one end to the opposite end, with an end drain opening or doorway. One or more tread plates are secured to the peripheral frame assembly and at least certain of the frame elements, such that the tread plates surround the drain units. The tread plates have drainage gradients extending from the peripheral frame assembly towards the drain units, to assure adequate liquid drainage.

In preferred forms, the frame elements are equipped with a plurality of spaced apart, somewhat Z-shaped concrete anchors, wherein the frame elements are generally L-shaped in cross-section and present elongated bights, and the anchors are secured to the frame elements along the length of the bights.

A preferred floor assembly includes one or more of the weldment frames located within a complemental recess, with a monolithic pour of concrete within and through the peripheral frame assemblies of the weldment frames. The tread plates are secured to the underlying weldment frames to complete the floor assembly.

A finished thermal processing cabinet is provided by erecting the walls thereof on the floor assembly. This involves placement of opposed cabinet walls within the channel segments, with the remaining walls situated atop the concrete pour.

BRIEF DESCRIPTION OF THE DRAWINGS

FIG. 7 is an enlarged, fragmentary, vertical sectional view illustrating the support for the primary and intermediate walls of a thermal processing cabinet;

FIG. 8 is a fragmentary vertical sectional view illustrating a drain region in a thermal processing cabinet floor;

FIG. 9 is an enlarged top perspective view illustrating a weldment frame in accordance with the invention, with one half of the frame having an attached tread plate and the other half depicting the tread plate components in exploded relationship relative to the underlying portion of the weldment frame; and FIG. 10 is a bottom perspective view of an assembled weldment frame.

DETAILED DESCRIPTION OF THE PREFERRED EMBODIMENT

Figure 1:
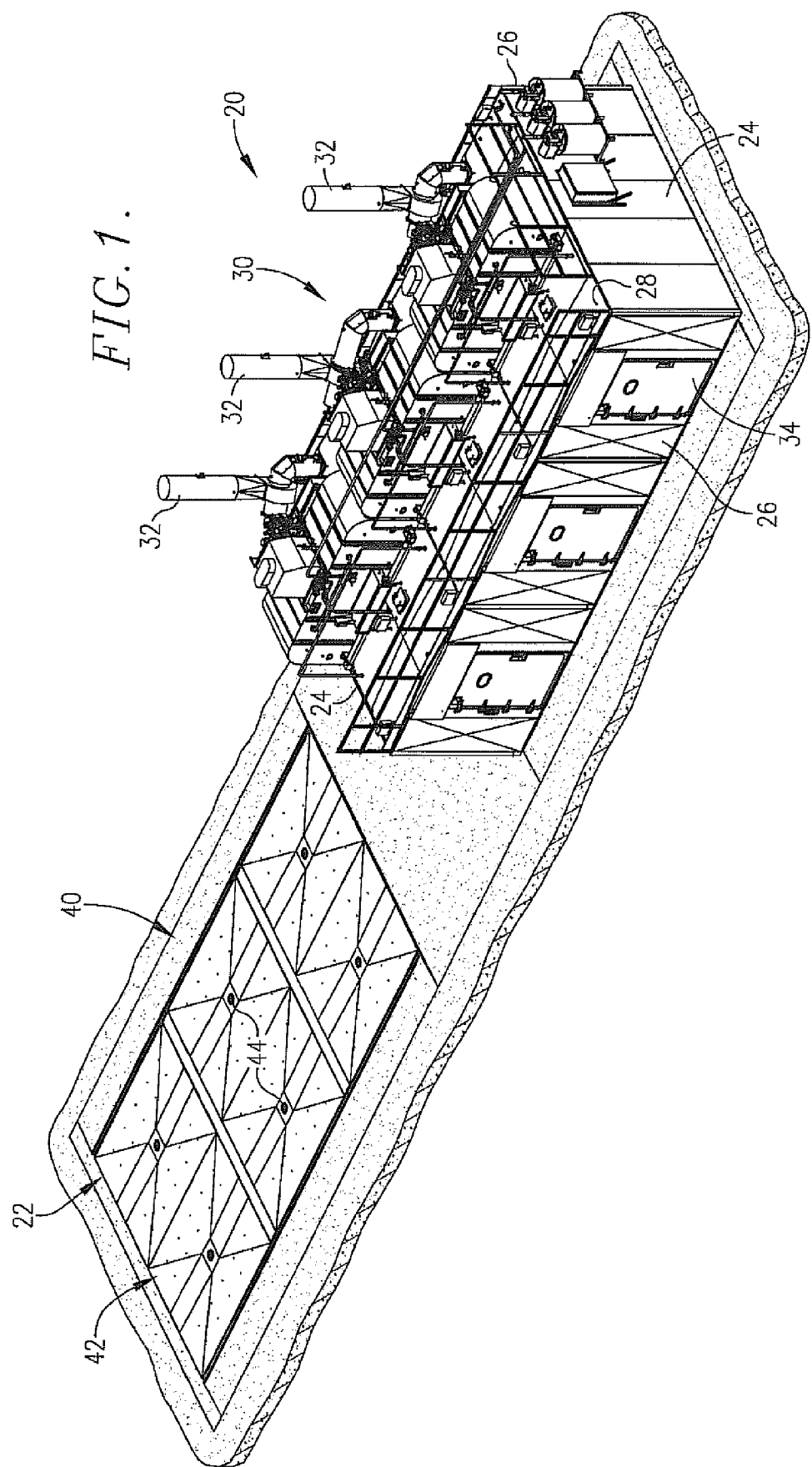
FIG. 1 is a perspective view of a completed thermal processing cabinet, and an adjacent thermal processing cabinet floor assembly, in accordance with the invention.

Turning now to the drawings, a multiple-chamber smokehouse 20 is illustrated in FIG. 1, mounted on a floor assembly 22. The smokehouse 20 is generally rectangular in plan configuration and has upright sidewalls 24, interconnected end walls 26, and roof 28. Air handling equipment 30 including exhaust stacks 32 are supported on roof 28 in the usual fashion. The end walls 26 have doors 34 and a pair of internal, intermediate walls 36 (see FIG. 7) divide the overall smokehouse 20 into three chambers.

The floor assembly 22 broadly includes a total of three adjacent weldment frames 38, a monolithic layer or pour of concrete 40 within and covering the frames 38, and tread plates 42. Each frame 38 is designed to receive a pair of spaced apart, upright, tubular, circumferentially collared drain units 44, with the tread plates 42 installed in surrounding, interconnected relationship to the drain units 44 as will be described.

In greater detail, the weldment frames 38 (see FIGS. 9-10) include a peripheral frame assembly 46 of rectangular C-channel configuration and comprising opposed shorter leg segments 48 and longer, opposed leg segments 50. The segments 48, 50 are each of C-shape cross-section and are welded together. A pair of wall-receiving channels 52 are respectively welded to and extend outwardly from and along the length of the shorter leg segments 48. A plurality of elongated, laterally spaced apart frame elements 54 are welded to and extend between the leg segments 50. Each of these elements 54 is substantially L-shaped in cross-section and presents an elongated corner 56. Oblique gussets 57 are provided at the corners and throughout the frame assembly as needed to afford adequate rigidity. A series of generally Z-shaped concrete anchors 58 are secured to each frame element 54 along the corner 56 thereof, these anchors 58 extend downwardly substantially to the level or slightly below the downward extent of the leg segments 48, 50. A series of cross braces 60 extend between and are interconnected to the central frame elements 54 as best seen in FIGS. 9 and 10.

In order to provide appropriate drainage gradients leading to each drain unit 44, the frame elements 54 and cross braces 60 are positioned with the uppermost edges thereof progressively decrease in height from the leg segments 48 and 50.

Figure 2:
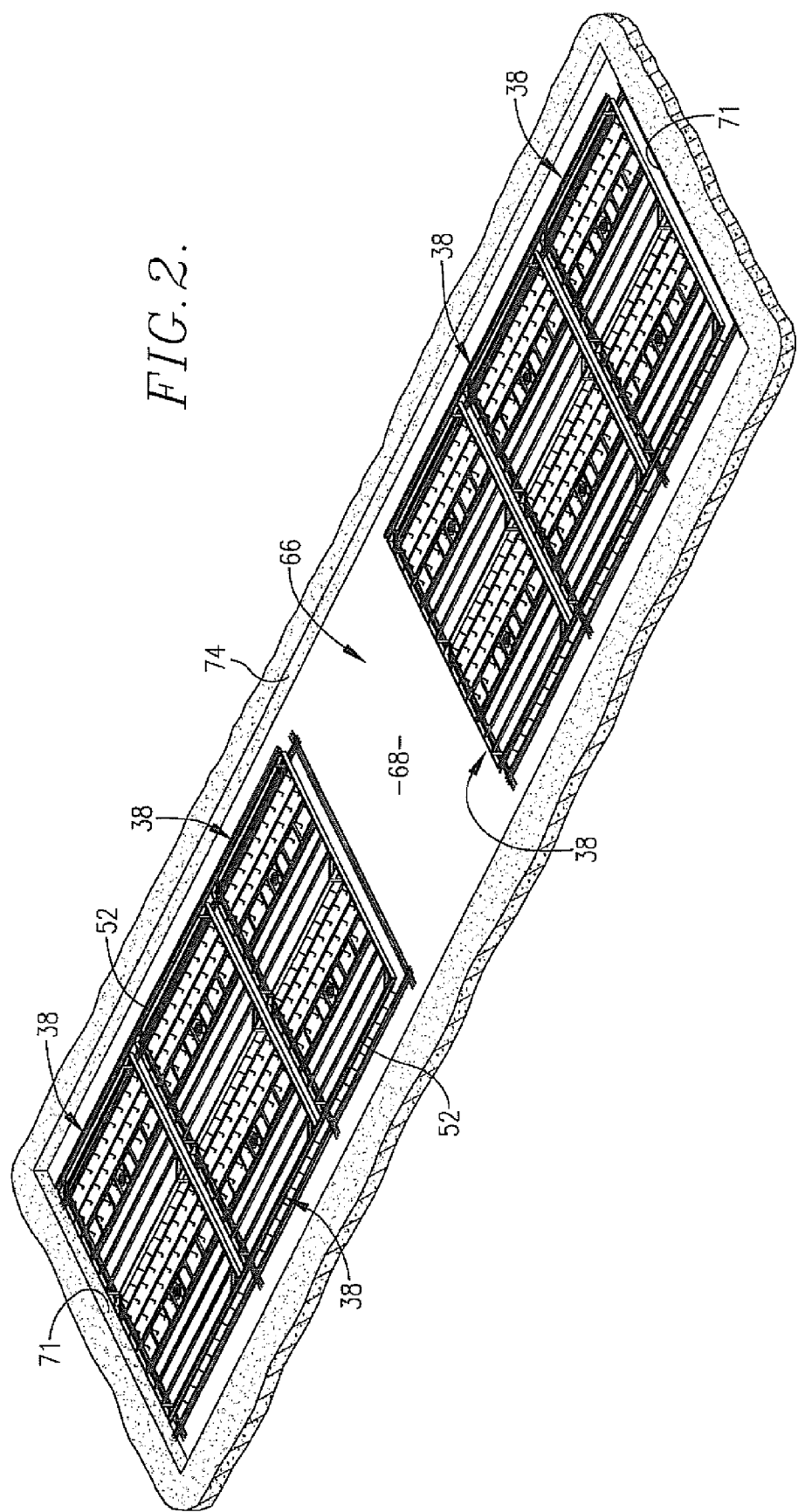
FIG. 2 is a perspective view of the initial step in forming the thermal processing cabinet floors of the invention, wherein a plurality of weldment frames are positioned within an appropriate recess.
Figure 3:
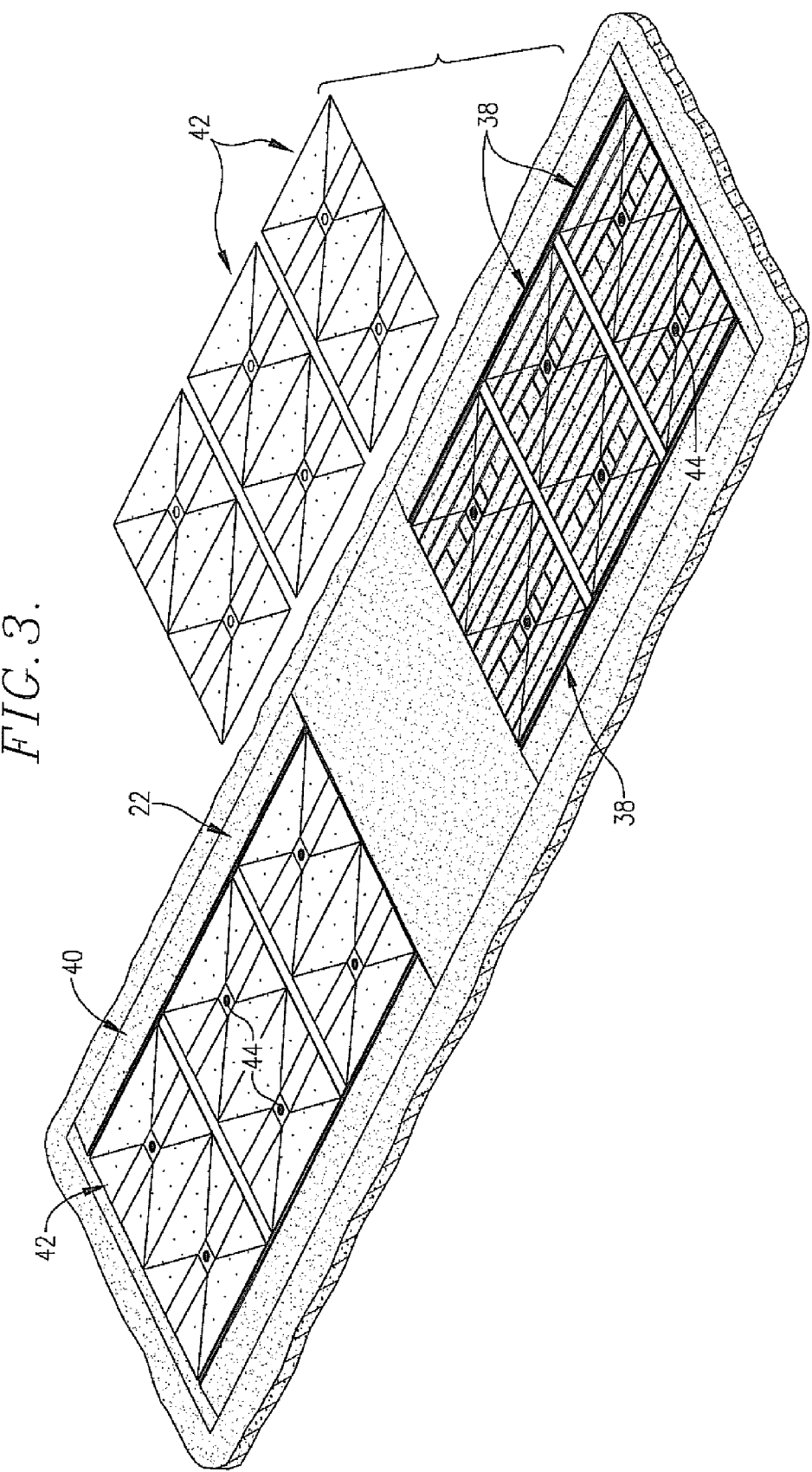
FIG. 3 is a view similar to that of FIG. 2, but illustrating the thermal processing cabinet floors after a monolithic concrete pour around and through the weldment frames, and with the tread plates of the right hand floor assembly illustrated in an exploded relationship to the underlying weldment frames.
Figure 4:
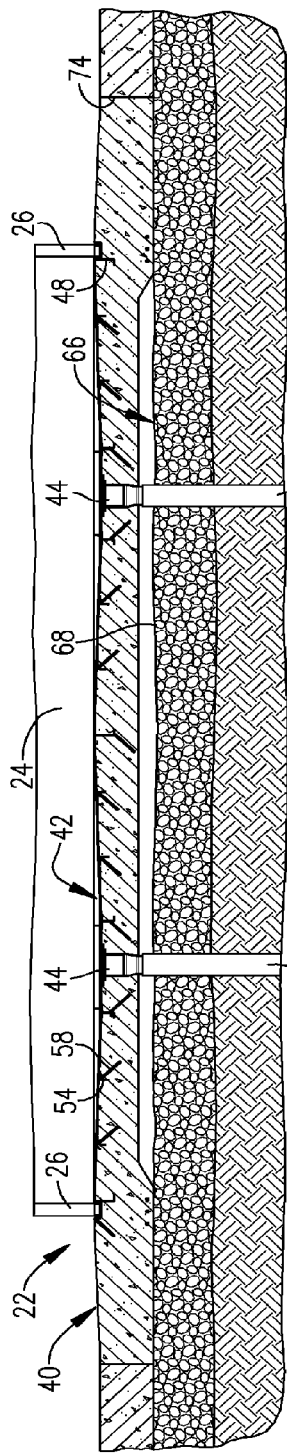
FIG. 4 is a vertical sectional view through a section of one of the thermal processing cabinet floors.
Figure 6:
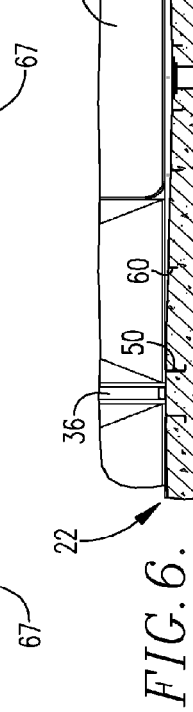
FIG. 6 is a fragmentary vertical sectional view illustrating a thermal processing cabinet floor, as well as portions of an upright primary wall of a thermal processing cabinet.
Figure 5:
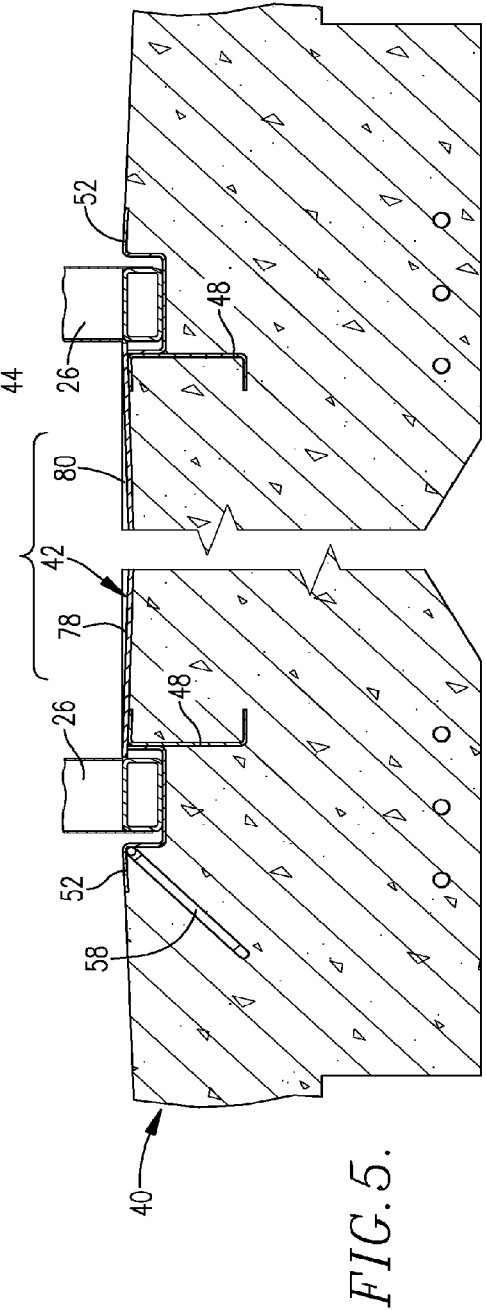
FIG. 5 is an enlarged, fragmentary sectional view illustrating the supports for the transverse end walls of a thermal processing cabinet.

In the construction of floor assembly 22, an appropriate recess 66 is formed as illustrated in FIGS. 2 and 4. In the illustrated embodiment, the recess 66 is of elongated, rectangular design, and is sized to accommodate two sets of three weldment frames 38 so as to permit construction of individual smokehouses. As depicted, the recess 66 includes a subgrade 68, upstanding end walls 71 and sidewalls 74. The weldment frames 38 are positioned within recess 66 so that the channels 52 are aligned and extend along the sidewalls 74. The drain units 44 are next coupled to the drains 67. If desired, the weldment frames 38 forming a part of each floor assembly 22 may be welded or otherwise interconnected together. In the next step illustrated in FIG. 3, the concrete 40 is poured into recess 66 in a manner to fill the individual weldment frames 38 and to otherwise fill the recess 66, leaving only the upper surfaces of the weldment frames exposed. The concrete 40 is screeded to conform with the drainage gradients provided by the weldment frames 38.

In the final construction step after curing of the concrete 40, the tread plates 42 are installed. As best seen in FIG. 9, each weldment frame 38 supports a pair of side-by-side tread plates 42, and each of the latter are made up of three components, namely a central, apertured drain component 76 and side components 78 and 80. The central drain component 76 is tapered towards a central opening 82 in conformity with the drainage gradient afforded by cross braces 60 and concrete 40, with opening 82 receiving the upper end of a drain unit 44. The side components 78, 80 are likewise formed with a slight taper to match the drainage gradient provided by the frame elements 54 and concrete 40. The side components 78, 80 have a series of weld openings 84 therein. In installation procedures, the components 76-80 are placed over the appropriate portions of the weldment frames 38 and are welded in place along the joints between the components, around the periphery of the components to the leg segments 48, 50, to collared drain units 44, and to the underlying frame elements 54 through the openings 84.

At this point the wall structures making up each smokehouse 20 are erected. This involves first placing the end walls 26 within the channels 52 and supporting the sidewalls 24 and intermediate walls 36 on the upper surface of concrete 40. These walls are then interconnected in the usual fashion and the remainder of each smokehouse is likewise conventionally constructed.

The completed smokehouses 20 are thus provided with essentially monolithically poured floor assemblies 22 which do not have pools or water collection regions typical with prior art designs. Moreover, the floor assemblies 22 are capable of withstanding very significant live and dead loadings without concrete fracture or deformation of the underlying weldment frame assemblies 38.

I claim:

1. A weldment frame designed for use in fabricating a thermal processing cabinet floor and comprising:
   a peripheral frame assembly including opposed wall-receiving channel segments;
   a plurality of elongated, laterally spaced apart frame elements secured to and extending between opposed portions of said peripheral frame;
   a plurality of spaced apart concrete anchors secured to each of said frame elements, said frame elements being generally L-shaped in cross-section and presenting an elongated corner, said anchors being secured to said frame elements along the lengths of said corners; and
   a tread plate secured to said peripheral frame assembly and at least certain of said frame elements.

2. The weldment frame of claim 1, said anchors being generally Z-shaped in configuration and extending below said peripheral frame assembly.

3. The weldment frame of claim 1, said peripheral frame assembly being generally rectangular in plan with a pair of opposed, long primary legs and a pair of opposed, transverse legs, said channel sections being secured to said transverse legs, said frame elements extending between and connected with said primary legs.

4. The weldment frame of claim 1, said tread plate having a plurality of weld openings therein, said tread plate being welded to said peripheral frame assembly through said weld openings.

5. The weldment frame of claim 1, including drainage structure associated with said weldment frame, said weldment frame and tread plate having a drainage gradient extending toward the drainage structure.

6. The weldment frame of claim 5, said drainage structure comprising a tubular drain unit within said peripheral frame, said tread plate surrounding said drain unit.

7. A weldment frame designed for use in fabricating a thermal processing cabinet floor and comprising:
   a peripheral frame assembly including opposed wall-receiving channel segments;
   a plurality of elongated, laterally spaced apart frame elements secured to and extending between opposed portions of said peripheral frame;
   a plurality of spaced apart concrete anchors secured to each of said frame elements, said frame elements being generally L-shaped in cross-section and presenting an elongated corner, said anchors being generally Z-shaped in configuration and extending below said peripheral frame assembly; and
   a tread plate secured to said peripheral frame assembly and at least certain of said frame elements.

8. A weldment frame designed for use in fabricating a thermal processing cabinet floor and comprising:
   a peripheral frame assembly including opposed wall-receiving channel segments;
   a plurality of elongated, laterally spaced apart frame elements secured to and extending between opposed portions of said peripheral frame; and
   a tread plate secured to said peripheral frame assembly and at least certain of said frame elements, said tread plate having a plurality of weld openings therein, said tread plate being welded to said peripheral frame assembly through said weld openings.

9. A thermal processing cabinet floor comprising:
   a weldment frame assembly located within a complemental recess, including—
      a peripheral frame assembly including opposed wall-receiving channel segments;
      a plurality of elongated, laterally spaced apart frame elements secured to and extending between opposed portions of said peripheral frame; and
      a tread plate secured to said peripheral frame assembly and at least certain of said frame elements; and
   a monolithic pour of concrete within and through said peripheral frame assembly and below said tread plate.

10. The thermal processing cabinet floor of claim 9, including a plurality of spaced apart concrete anchors secured to each of said frame elements.

11. The thermal processing cabinet floor of claim 10, said frame elements being generally L-shaped in cross-section and presenting an elongated corner, said anchors being secured to said frame elements along the length of said corners.

12. The thermal processing cabinet floor of claim 10, said anchors being generally Z-shaped in configuration and extending below said peripheral frame assembly.

13. The thermal processing cabinet floor of claim 9, said peripheral frame assembly being generally rectangular in plan with a pair of opposed, long primary legs and a pair of opposed, transverse legs, said channel sections being secured to said transverse legs, said frame elements extending between and connected with said primary legs.

14. The thermal processing cabinet floor of claim 9, said tread plate having a plurality of weld openings therein, said tread plate being welded to said peripheral frame assembly through said weld openings.

15. The thermal processing cabinet floor of claim 9, said tread plate formed of a plurality of individual plate components each welded to said peripheral frame assembly.

16. The thermal processing cabinet floor of claim 9, including drainage structure associated with said weldment frame, said weldment frame and tread plate having a drainage gradient extending toward the drainage structure.

17. The thermal processing cabinet floor of claim 16, said drainage structure comprising a tubular drain unit within said peripheral frame, said tread plate surrounding said drain unit.

18. A thermal processing cabinet comprising:
   a thermal processing cabinet floor comprising—
      a peripheral frame assembly including opposed wall-receiving channel segments;
      a plurality of elongated, laterally spaced apart frame elements secured to and extending between opposed portions of said peripheral frame; and
      a tread plate secured to said peripheral frame assembly and at least certain of said frame elements;
   a monolithic pour of concrete within and through said peripheral frame assembly and below said tread plate; and
   upright thermal processing cabinet wall structure including a first pair of opposed walls received within said channel segments, and a second pair of opposed walls supported by said concrete.

19. The thermal processing cabinet of claim 18, including a plurality of spaced apart concrete anchors secured to each of said frame elements.

20. The thermal processing cabinet of claim 19, said frame elements being generally L-shaped in cross-section and presenting an elongated corner, said anchors being secured to said frame elements along the length of said corners.

21. The thermal processing cabinet of claim 19, said anchors being generally Z-shaped in configuration and extending below said peripheral frame assembly.

22. The thermal processing cabinet of claim 18, said peripheral frame assembly being generally rectangular in plan with a pair of opposed, long primary legs and a pair of opposed, transverse legs, said channel sections being secured to said transverse legs, said frame elements extending between and connected with said primary legs.

23. The thermal processing cabinet of claim 18, said tread plate having a plurality of weld openings therein, said tread plate being welded to said peripheral frame assembly through said weld openings.

24. The thermal processing cabinet of claim 18, said tread plate formed of a plurality of individual plate components each welded to said peripheral frame assembly.

25. The thermal processing cabinet of claim 18, said wall structure including an intermediate wall substantially parallel and between said second pair of walls.

26. The thermal processing cabinet of claim 18, said cabinet being a smokehouse.

27. The thermal processing cabinet of claim 18, including drainage structure associated with said weldment frame, said weldment frame and tread plate having a drainage gradient extending toward the drainage structure.

28. The thermal processing cabinet of claim 27, said drainage structure comprising a tubular drain unit within said peripheral frame, said tread plate surrounding said drain unit.

* * * * *